United States Patent [19]

Snyder et al.

[11] Patent Number: 4,865,695

[45] Date of Patent: Sep. 12, 1989

[54] PREPARATION OF COMPLEXES OF ZIRCONIUM AND HAFNIUM TETRACHLORIDES WITH PHOSPHORUS OXYCHLORIDE

[75] Inventors: Thomas S. Snyder, Oakmont; Richard A. Stoltz, Murrysville, both of Pa.

[73] Assignee: Westinghouse Electric Corp., Pittsburgh, Pa.

[21] Appl. No.: 242,572

[22] Filed: Sep. 12, 1988

[51] Int. Cl.$^4$ .................. B01D 3/32; C01G 25/04; C01G 27/04

[52] U.S. Cl. ........................... 203/29; 203/39; 203/51; 203/DIG. 16; 204/64 T; 204/130; 423/73; 423/492

[58] Field of Search ............. 203/50, 51, 39, DIG. 25, 203/29, DIG. 16; 423/73, 76, 492, 72, 78; 204/39, 130; 75/84.5

[56] References Cited

U.S. PATENT DOCUMENTS

| | | | |
|---|---|---|---|
| 1,582,860 | 4/1926 | van Arkel | 423/73 |
| 2,744,060 | 5/1956 | Eaton | 203/50 |
| 2,816,814 | 12/1957 | Plucknett | 203/71 |
| 2,928,722 | 3/1960 | Scheller | 203/51 |
| 2,938,769 | 5/1960 | Overholser | 423/70 |
| 3,006,719 | 10/1961 | Miller | 423/70 |
| 3,067,112 | 12/1962 | Trumpler | 423/492 |
| 3,098,722 | 7/1963 | Carlson et al. | 203/29 |
| 3,671,186 | 6/1972 | Ishizuka | 423/73 |
| 3,764,493 | 10/1973 | Nicks et al. | 204/64 R |
| 3,966,458 | 6/1976 | Spink | 75/84.5 |
| 4,021,531 | 4/1977 | Besson | 423/73 |
| 4,578,252 | 3/1986 | Pastor et al. | 423/492 |
| 4,670,121 | 6/1987 | Ginatta | 204/225 |
| 4,737,244 | 4/1988 | McLaughlin et al. | 423/73 |
| 4,749,488 | 6/1988 | Stoltz et al. | 423/73 |

FOREIGN PATENT DOCUMENTS

| | | | |
|---|---|---|---|
| 1171664 | 7/1984 | Canada | 423/73 |
| 2543162 | 9/1984 | France | |

OTHER PUBLICATIONS

Vinarov: Modern Methods of Separating Zirconium and Hafnium; Russian Chemical Reviews, vol. 36, No. 7, Jul. 1967, pp. 522–536.
Plucknett–AEC Report ISC-51-1949.
Mackenzie & Murphy; J. Chem. Phys. 33366, 1960.
Williams, U.S. AEC Report NY00-1009, Aug. 1950.

*Primary Examiner*—Wilbur Bascomb
*Attorney, Agent, or Firm*—R. A. Stoltz

[57] ABSTRACT

This is a method for molten salt systems related to distillation for zirconium-hafnium separation and prevents buildup of iron chloride by electrochemically reducing iron from the molten salt to give very low levels of iron chloride in the distillation column, to reduce corrosion, improve the product and, in some cases, to allow the molten salt system to be run continuously. The improvement comprises electrochemical purification of molten salt containing zirconium-hafnium chloride either, prior to introduction of the zirconium-hafnium chloride into a distillation column, or after introduction, or both, to substantially eliminate iron chloride from the zirconium-hafnium chloride. The molten salt during the electrochemical purification consists essentially of a mixture of chlorides of alkali metals, alkaline earth metals, zirconium, hafnium, aluminum, manganese, and/or zinc.

8 Claims, No Drawings

PREPARATION OF COMPLEXES OF ZIRCONIUM AND HAFNIUM TETRACHLORIDES WITH PHOSPHORUS OXYCHLORIDE

CROSS-REFERENCE TO RELATED APPLICATIONS

A process for zirconium-hafnium separation is described in related application Ser. No. 242,574, filed Sept. 12, 1988 and assigned to the same assignee. That related application utilizes a complex of zirconium-hafnium chlorides and phosphorus oxychloride prepared from zirconium-hafnium chloride with the complex of zirconium-hafnium chloride and phosphorus oxychloride being introduced into a distillation column and a hafnium chloride enriched stream is taken from the top of the column and a zirconium enriched chloride stream is taken from the bottom of the column, and in particular with prepurifying said zirconium-hafnium chlorides prior to introduction of the complex into a distillation column to substantially eliminate iron chloride from the zirconium-hafnium chloride, whereby buildup of iron chloride in the distillation column is substantially eliminated and the column can be operated in a continuous, stable manner.

A process for zirconium-hafnium separation is described in related application Ser. No. 242,571, filed Sept. 12, 1988 and assigned to the same assignee. That related application utilizes a complex of zirconium-hafnium chloride and phosphorus oxychloride introduced into a distillation column, with a hafnium chloride enriched stream of complex taken from the top of the column and a zirconium-enriched chloride stream of complex taken from the bottom of the column, followed by reduction of the zirconium or hafnium chloride from complex taken from the distillation column by electrochemically bringing zirconium or hafnium out of a molten salt bath, with the molten salt in the molten salt bath consisting principally of a mixture of alkali metal and alkaline earth metal chlorides and zirconium or hafnium chloride.

A process for zirconium-hafnium separation is described in related application Ser. No. 242,570, filed Sept. 12, 1988 and assigned to the same assignee. That related application utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride taken from the bottom of distillation column is provided by electrochemically reducing zirconium from the molten salt solvent. A pressurized reflux condenser is used on the top of the column to add zirconium-hafnium chloride to the previously stripped molten salt solvent which is being circulated back to the top of the column.

A process for zirconium-hafnium separation is described in related application Ser. No. 242,564, filed Sept. 12, 1988 and assigned to the same assignee. That related application utilizes a feed containing zirconium-hafnium chloride introduced into a distillation column, and a hafnium chloride enriched stream taken from the top of the column and a zirconium enriched chloride stream taken from the bottom of the column, and with reduction to metal of the zirconium and/or hafnium chloride taken from the distillation column by electrochemically reducing an alkaline earth metal in a molten salt bath with the molten salt in the molten salt bath consisting principally of a mixture of at least one alkali metal chloride and at least one alkaline earth metal chloride and zirconium or hafnium chloride, with the reduced alkaline earth metal reacting with the zirconium or hafnium chloride to produce zirconium or hafnium metal product and alkaline earth metal chloride.

A process for separating nickel from zirconium for recycling nickel-containing zirconium alloy is described in related application Ser. No. 242,573, filed Sept. 12, 1988 and assigned to the same assignee. That related application utilizes placing nickel-containing zirconium metal in a molten salt bath with the molten salt in the molten salt bath consisting principally of a mixture of at least two alkali metal fluorides to produce a molten salt bath containing dissolved zirconium, electrochemically plating the nickel from the molten salt bath at a voltage sufficient to plate nickel but less than the voltage to plate zirconium to provide an essentially nickel-free molten salt bath; and then electrochemically reducing the zirconium from the essentially nickel-free molten salt bath to provide an essentially nickel-free zirconium.

A process for removing phosphorus oxychloride from a complex of zirconium or hafnium chloride and phosphorus oxychloride is described in related application Ser. No. 242,563, Filed Sept. 12, 1988 and assigned to the same assignee. That related application utilizes an alkali metal chloride molten salt absorber vessel with a condenser which has the complex of zirconium or hafnium chloride and phosphorus oxychloride as the condensing fluid to scrub zirconium or hafnium chloride from the phosphorus oxychloride vapor. The process uses at least one separate vessel to strip the zirconium or hafnium chloride from the alkali metal chloride molten salt.

BACKGROUND OF THE INVENTION

This invention relates to molten salt distillation to separate hafnium from zirconium and in particular relates to electrochemically preventing a buildup of iron chloride in molten salts (e.g. in phosphorus oxychloride complex of zirconium-hafnium chloride).

Molten (fused) salt electrochemical (electrolytic) processes for deposition of metal on one electrode (with evolution of chlorine gas at the other electrode) are known in the art. U.S. Pat. Nos. 3,764,493 to Nicks et al. and 4,670,121 to Ginatta et al. are examples of such processes.

Naturally occurring zirconium ores generally contain from 1 to 3 percent hafnium oxide relative to zirconium oxide. In order that the zirconium metal be acceptable as a nuclear reactor material, the hafnium content must first be reduced to low levels, due to the high neutron absorption cross section of hafnium. This separation process is difficult due to the extreme chemical similarity of the two elements. A number of techniques have been explored to accomplish this separation, with the technique currently in use in the United States involving liquid-liquid extraction of aqueous zirconyl chloride thiocyanate complex solution using methyl isobutyl ketone, generally as described in U.S. Pat. No. 2,938,679, issued to Overholser on May 31, 1960, with the removal of iron impurities prior to solvent extraction generally as described in U.S. Patent 3,006,719, issued to Miller on Oct. 31, 1961.

Several other processes have been suggested for separation of the zirconium-hafnium tetrachloride (Zr, Hf)Cl$_4$ generated from the ore by carbochlorination. The use of a nonaqueous separation offers significant economic incentive over those processes requiring aqueous zirconium solutions. Direct distillation of the tetrachlorides provides one possible route, relying on the difference in boiling points between zirconium tetrachloride and hafnium tetrachloride. Unfortunately, direct distillation cannot be accomplished at near atmospheric pressure, since neither tetrachloride exhibits a liquid phase except at very high pressure. U.S. Pat. No. 2,852,446, issued to Bromberg on Sept. 16, 1958, describes a high pressure distillation process where the pressure, rather than a solvent, provides for a liquid phase.

U.S. Pat. No. 2,816,814 issued to Plucknett on Dec. 17, 1957, describes extractive distillation for separation of the tetrachlorides using a stannous chloride solvent. U.S. Pat. No. 2,928,722 to Scheller, issued Mar. 15, 1960, describes the batch fractional distillation of niobium and tantalum chlorides to separate these chlorides from each other and from other chloride impurities, and uses a "flux" to provide the molten salt phase, utilizing either zirconium tetrachloride-phosphorus oxychloride complex or an alkali metal chloride and aluminum (or iron, or zirconium) chloride mixture as the flux. U.S. Pat. No. 3,966,458 issued to Spink on June 29, 1976 provides a sodium-potassium chloride solvent for use in the extractive distillation of zirconium and hafnium tetrachlorides. U.S. Pat. No. 3,671,186 issued to Ishizuka on June 20, 1972 utilizes a series of dissolution and evaporation stages with a solvent such as sodium chloride. U.S. Pat. No. 4,021,531 issued to Besson on Apr. 3, 1977, utilizes extractive distillation with an alkali metal chloride and aluminum (or iron) chloride mixture as the solvent. Extractive distillation of zirconium-hafnium tetrachloride with a pure zinc chloride solvent has been attempted (Plucknett et al., AEC Report ISC-51, 1949), but was unsuccessful due to the formation of a highly viscous two-phase system. The anomalously high viscosity of zinc chloride is described by MacKenzie and Murphy (J. Chem. Phys., 33, 366, 1960). U.S. Pat. No. 4,737,244 to McLaughlin et al. describes an extractive distillation method for separating hafnium from zirconium of the type wherein a mixture of zirconium and hafnium tetrachlorides is introduced into a distillation column, with a recirculating molten salt solvent in the column to provide a liquid phase, and the improvement comprising having a molten salt solvent composition of at least 30 mole percent zinc chloride and at least 10 mole percent of lead chloride.

A process for zirconium-hafnium separation is described in U.S. Pat. No. 4,749,448 filed issued June 7, 1988 to Stoltz et al. This patent provides for zirconium-hafnium separation by extractive distillation with the molten solvent containing zinc chloride, it utilizes at least 80 mole percent zinc chloride, with the remainder including a viscosity reducer of magnesium chloride, calcium chloride, or mixtures thereof.

Of all of the molten salt distillation processes, only the above-mentioned Besson process with a potassium chloride-aluminum chloride solvent has been brought to commercial development. This process is currently in use in France and provides product zirconium tetrachloride, relatively depleted of hafnium tetrachloride in the liquid bottoms stream, and a hafnium tetrachloride enriched vapor stream taken from the top of the column. A relatively high reflux is provided by a condenser at the top of the column and a reboiler at the bottom of the column. Because of the stability of the double salts formed with the alkali metal chloride in the solvent, it is very difficult to completely separate the product zirconium tetrachloride from the solvent, and relatively high (e.g. 500° C.) temperatures are required. Aluminum chloride in excess of 1:1 molar to alkali metal chloride is required and there is considerable carry-over of aluminum chloride into the zirconium tetrachloride leaving the stripper. French Pat. No. 2,543,162 (9-28-84) to Brun and Guerin describes a post-stripping process for removing aluminum chloride. In addition, it should be noted that aluminum chloride is an especially hygroscopic and corrosive molten salt, and, at higher temperatures, is very difficult to handle.

Another separation process involves fractionation of the chemical complex formed by the reaction of (Zr,Hf)Cl$_4$ with phosphorus oxychloride (POCl$_3$). This technique was patented in 1926 by van Arkel and de Boer (U.S. Pat. No. 1,582,860), and was based on the approximately 5° C. boiling point difference between the hafnium and zirconium complex pseudoazeotropes, having the nominal compositions 3(Zr,Hf)Cl$_4$:2POCl$_3$. This composition may be produced by direct reaction between liquid phosphorus oxychloride and the crude zirconium-hafnium tetrachloride obtained from opening of the ore.

Extensive work was done on the zirconium-hafnium tetrachloride complex with phosphorus oxychloride in the early 1950s, utilizing generally the molten salt distillation process of the aforementioned U.S. Pat. No. 1,582,860 of van Arkel and de Boer. While this extensive effort did provide some separation, the liquid in the reboiler became viscous during operation and both the reboiler liquid volatility and the Hf/Zr separation factor degraded significantly with time. Despite the extensive investment in time and money, this approach was abandoned and the U.S. effort was concentrated on the liquid-liquid extraction described in the above-mentioned U.S. Pat. No. 2,938,769 of Overholser. The liquid-liquid extraction remains the only commercially utilized process for zirconium-hafnium separation in the United States today.

SUMMARY OF THE INVENTION

This Invention is for molten salt systems related distillation for zirconium-hafnium separation and prevents buildup of iron chloride by electrochemically reducing iron from the molten salt in a purification vessel to give very low levels of iron chloride in the distillation column, to reduce corrosion, improve the product and, in some cases, to allow the molten salt system to be run continuously. The buildup of iron chloride can be prevented in a molten salt prepurification system which cleans the feed prior to the introduction into the distillation column. With an appropriate molten salt solvent in the distillation system, the buildup can alternately, or in addition, be directly prevented within the distillation system itself.

This method is an improvement on separation systems of the type wherein zirconium-hafnium chloride (possibly as part of phosphorous oxychloride complex) is introduced into a distillation column and a hafnium chloride enriched vapor stream is taken from the top of the column and a zirconium enriched chloride stream is taken from the bottom of the column. The improvement comprises purification of molten salt containing zirconium-hafnium chloride (tetrachloride) either prior to introduction of the zirconium-hafnium chloride into a distillation column, or after introduction (or both) to substantially eliminate iron chloride. Preferably the molten salt during the electrochemical purification consisting essentially of a mixture of alkali metal and alkaline earth metal chlorides, zirconium-hafnium chloride and impurities, but the molten salt can consist essentially of any molten halides (primarily chlorides) of elements of whose ions have a higher reduction potential (a higher negative voltage) than iron in the molten salt system being utilized (e.g., from Table I, below, it can be seen that chlorides of alkali metals and alkaline earth metals, zirconium, hafnium, aluminum, manganese, and zinc have reduction potentials above the 1.172 of iron). The purification is by (at least periodically) removing iron chloride from said molten salt purification vessel by electrochemically plating iron onto an electrode.

In prepurification before introduction into the distillation column, preferably, the molten salt in the molten salt purification-vessel consists essentially of a mixture of lithium chloride and potassium chloride and zirconium-hafnium chloride in preferably near-eutectic proportions. The purification vessel can be operated at 300-400 degrees C. and purified zirconium-hafnium can be sublimed out of the purification vessel, and, for example, fed directly to the distillation column.

This invention can be used, for example, in conjunction with related application Ser. No. 242,574, filed Sept. 12, 1988 and assigned to the same assignee. That related application utilizes a complex of zirconium-hafnium chlorides and phosphorus oxychloride prepared from zirconium-hafnium chlorides with the complex of zirconium-hafnium chlorides and phosphorus oxychloride being introduced into a distillation column and in particular with prepurifying said zirconium-hafnium chlorides prior to introduction of said complex into a distillation column to substantially eliminate iron chloride from the zirconium-hafnium chlorides. This invention provides improved purification in that process by electrochemically reducing iron from the molten salt in the prepurification vessel. It should be noted that iron chloride has some vapor pressure at the operating temperature of the molten salt bath and that when the purified zirconium-hafnium chloride is sublimed from the purifying bath, the level of iron chloride in the column will be proportional to (but, of course, much lower than) the level of iron chloride in the purifying bath. Thus the invention herein directly avoids buildup and generally reduces levels of iron chloride in the purification bath, and thus indirectly reduces level of iron in the distillation column.

This invention can also be used, for example, in conjunction with related application Ser. No. 242,570, filed Sept. 12, 1988 which utilizes an extractive distillation column with a mixture of zirconium and hafnium tetrachlorides introduced into a distillation column and a molten salt solvent circulated through the column to provide a liquid phase, and with the molten salt solvent consisting principally of lithium chloride and at least one of sodium, magnesium and calcium chlorides. Stripping of the zirconium chloride from the stream taken from the bottom of distillation column is provided in that copending application by electrochemically reducing zirconium from the molten salt solvent. Previous to the stripping molten salt solvent (upstream from the stripper), iron chloride can be removed by the process of this invention (at a voltage of about 1.172-1.75 which is high enough to remove iron, but low enough that zirconium is not also reduced) to lower iron content in the zirconium product. As the distillation column has a recirculating molten salt solvent which can be circulated to the molten salt purification vessel, the purification in a molten salt purification vessel can be after introduction of said zirconium-hafnium chloride into said distillation column in such systems. This invention could also be used in a similar extractive distillation which used thermal, rather than electrochemical stripping, in which case this invention would not only give a more pure product, but would also prevent buildup of iron chloride (with the resultant corrosion and operating problems) in the distillation column. Similarity, the invention can be used (with a voltage between 1.172 and 1.566 volts) on the molten salt in the distillation column with the aforementioned U.S. Pat. No. 4,749,448 (which discloses an extractive distillation method with a molten salt solvent having a composition of at least 80 weight percent zinc chloride and at least 5 percent of a viscosity reducer of magnesium chloride, calcium chloride, sodium chloride, or potassium chloride or mixtures thereof). This invention can also be used, for example to lower corrosion, on distillation systems such as the aforementioned Besson patent, as the iron chloride can be removed at a voltage low enough that neither the potassium nor the aluminum of the molten salt solvent that system will be reduced. Further, this invention can be utilized to purify the feed material (either instead of, or in addition to purifying the circulating solvent), in the aforementioned types of systems.

DESCRIPTION OF THE PREFERRED EMBODIMENTS

This method is especially useful as an improvement on the aforementioned related application Ser. No. 242,574, filed Sept. 12, 1988 which utilizes a complex of zirconium-hafnium chlorides and phosphorus oxychloride prepared from zirconium-hafnium chlorides with the complex of zirconium-hafnium chlorides and phosphorus oxychloride being introduced into a distillation column for prepurifying said zirconium-hafnium chlorides. This invention provides improved purification in that process by electrochemically reducing iron from the molten salt in the prepurification system. As such, the following discussion will generally use that system, even though, as noted herein, the invention can be used on other molten salt systems. related to zirconium-hafnium separation.

Despite the extensive experimentation done on the zirconium-hafnium tetrachloride complex with phosphorus oxychloride (hereinafter "complex"), and despite the fact that iron chloride was a known impurity in zirconium-hafnium tetrachloride (being removed prior to liquid-liquid extraction as described in the aforementioned Miller U.S. Pat. No. 3,006,719), it was heretofore unappreciated that iron chloride was a major source of column instability in distillation of the complex. This is perhaps because iron chloride at the normal impurity levels does not interfere with separation, but iron chloride levels in the liquid phase rise as portions of the complex are vaporized, (iron chlorides can also be introduced as the result of corrosive attack on ferrous alloy column internals) and the higher iron chloride concentrations do interfere with distillation column operation. As noted in AEC Report NYOO-1009, 1950, early attempts in distillation of the complex produced a viscous reduced-volatility residue in the reboiler, and the dropping of vapor pressure in the column reestablishing column vapor pressure by raising temperatures gives only a short period of additional column operation. After numerous recent experiments it was discovered that elimination of iron chloride from the feed complex eliminated both the changes in column pressure (at a given temperature) and eliminated the thickening of the reboiler fluid (see aforementioned related application Ser. No. 242,574

Crude zirconium tetrachloride obtained from opening of zirconium ores typically contains significant quantities of iron, some of which was present in the ore itself, and some of which is introduced during the milling and handling of the ore. Chlorides of a number of other impurity elements may also be present, including titanium aluminum, silicon, niobium, tantalum, uranium, and thorium, in various concentrations. All of the above chlorides also form complexes with phosphorus oxychloride, and as such may become involved in the process chemistry; the interaction of each with the distillable zirconium-hafnium chloride complex must therefore be considered. In particular, the $POCl_3$ complexes of ferric chloride ($FeCl_3$) may be very troublesome, for a number of reasons. First of all, iron must be removed from zirconium at some point in the process to satisfy the specifications for nuclear-grade zirconium. In the solvent extraction process currently used in the United States of zirconium-hafnium separation, a special iron-removal column is devoted solely to this purpose, due to the large quantities of iron that may be present in the system. In the case of a $POCl_3$-complex fractionation process, it was previously assumed that iron removal could take place after the distillation, e.g. a alkali metal chloride molten salt system for recovery of separated $ZrCl_4$ from the complex will also accomplish removal of iron chlorides, since iron is known to form stable double salts with alkali metal chlorides (Morozov and Tsegledi, *Russ. J. Inorg. Chem.*, 6, 1397, 1961) and will remain with the molten salt bath. However, if removal of $FeCl_3$ is deferred until the tetrachloride recovery step, the presence of the $FeCl_3$—$POCl_3$ complex will have a detrimental effect on the operation of the fractionation column. Two complexes are known: $2FeCl_3 \cdot 3POCl_3$ and $FeCl_3 \cdot POCl_3$ (Dadape and Rao, *J. Am. Chem. Soc.*, 77, 6192, 1955), of which only the latter is chemically stable at the operating temperatures of the fractionation process (355° to 360° C.). The $FeCl_3 \cdot POCl_3$ complex is less volatile than the zirconium and hafnium complexes, and will remain predominantly in the reboiler. Even in a batch distillation, the iron content of the charge introduced in the feed mixture will, therefore, gradually increase in concentration.

This problem proved to be a major difficulty in previous attempts to commercialize the $POCl_3$-complex fractionation process for zirconium-hafnium separation. Williams et al. (U.S. AEC Report NYOO-1009, 1950) observed not only accumulation of nonvolatile material in the reboiler during batch distillations, but a great reduction in the degree of separation of zirconium and hafnium after a certain point. Even during continuous distillations, situations are described when the overheads product flow would gradually diminish and the column temperature rise, accompanied by a decrease in separation. This was "cured" by introduction of additional feed to the reboiler, and the problem attributed to "an insufficient amount of material in the column for efficient... operation." The erratic and degraded separation factors which resulted from Williams' test program was one of the major factors leading to abandonment of this process by the AEC in 1950.

As indicated in copending application Ser. No. 242,574, noted above, it is now believed that the probable cause was production of a non-volatile phase, high in $FeCl_3$, and a molten system of NaCl, KCl, or a mixture thereof in a near-eutectic composition with $(Zr,Hf)Cl_4$ may be used as an effective system for removal of $FeCl_3$ from impure crude tetrachloride. The melting point of a eutectic mixture of 63 mole percent $(Zr,Hf)Cl_4$, 8% NaCl, and 29% KCl is given (Kim and Spink, *J. Chem. Eng. Data*, 19. 36, 1974) as 230° C. Solid $(Zr,Hf)Cl_4$ leaving the chlorination system is added to the molten salt sublimer, and dissolves in the melt, kept at approximately the tetrachloride sublimation temperature of 330° C. The liquid-phase complex $(Na,K)_2(Zr,Hf)Cl_6$ which is formed is in continuous dissociation equilibrium with the vapor phase $(Zr,Hf)Cl_4$. The vapor pressure of tetrachloride over the melt may be kept at one atmosphere by adjustment of the melt temperature, such that purified $(Zr,Hf)Cl_4$ vapor may be continuously withdrawn from the system. The iron chloride remains in the melt, exhibiting a very low vapor pressure at this temperature due to the greater stability of the $(Na,K)FeCl_4$. Iron, even if the feed has very low iron levels, will thus accumulate in the molten salt bath. In addition, a number of other, low-volatility, chlorides will also be removed.

The present invention teaches the purification of zirconium and hafnium tetrachlorides by molten salt electrolysis. The principal electrolytes include the eutectic LiCl-KCl at (whose melting point is lowered below 360° C. by the addition of zirconium-hafnium chloride) and $ZnCl_2$-KCl non-eutectic at 280° C. By operating the cell voltages below the reduction voltages of the electrolyte constituents and of $HfCl_4$ and $ZrCl_4$, the cell selectively removes contaminants such as iron and nickel. The present process offers advantages over prior purification approaches for zirconium and hafnium tetrachlorides. It minimizes the electrical and chemical requirements for purification since it removes the minor constituents, the contaminants from solution. Second since the electromotive series is quantitative in its reduction behavior, it offers superior process control.

The first production step for nuclear grade zirconium and hafnium metals has been to crack the natural ore into chemical forms amenable to further processing. For zicon sand, the preferred cracking route is chlorination at 1000°-1200° C. resulting in vapor phase $ZrCl_4$, $HfCl_4$ and $SiCl_4$ contaminated with a variety of metal chlorides in low concentrations. Of these metals, iron is a principal component. Traditional process art separates the silicon from the hafnium-zirconium tetrachlorides by differential condensation. In the U.S., the zirconium and hafnium tetrachlorides have been separated and purified by a series of hydrometallurgical processes. These processes also result in the intermediate products zirconium oxide and hafnium oxide which require a second expensive chlorination step prior to their reductions to metal (zirconium and hafnium chlorides are, of course, separately reduced to the metals by known processes).

A significant process advantage occurs if the zirconium and hafnium could be separated and purified as tetrachlorides. Distillation as molten salts or $POCl_3$ complexes is feasible; however, iron chloride inhibits these processes and corrodes process vessels.

The present invention uses molten (fused) salt electrolysis to electively remove iron and other process metallic contaminants such as nickel and copper.

Zircon sand generally is chlorinated in excess of 1000° C. After the silicon tetrachloride and offgases are removed by differential condensation, a solution of (Zr/Hf)Cl$_4$ (and other metal chloride contaminants) may be formed in the molten salt electrolyte. The salt preferred for the electrolyte is (prior to addition of the (Zr/Hf)Cl$_4$) 59 mole % LiCl$_3$-41 mole % KCl. The electrolysis cell may be under pressure or reflux, as required to shift the vapor-liquid equilibria toward the liquid. The cell operating temperature varies as a function of electrolyte, but operating temperatures of 300°–400° C. (especially about 330°) are preferred.

The electromotive series in Table I (from Bard, A. J., *Encyclopedia of Electrochemistry of the Eluents*, Marcel Dekkar, 1976) for the LiCl-KCl salt demonstrates that if the cell is operated below 1.7 volts and preferably below 1.5 volts, metal contaminants such as the following will be won from solutions:

Titanium—Reduction Potential at 1.49 volts—these voltages are relative to a platinum reference electrode.
Iron—Reduction Potential at 0.75 volts
Copper—Reduction Potential at 0.45 volts
Nickel—Reduction Potential at 0.80 volts As the contaminants plate out, the bulk of the zirconium and hafnium remain in solution. Therefore the process chemical and electrical requirements are minimized. The molten salt proceeds to the next step, e.g., in which the (Zr/Hf)/Cl$_4$ solution equilibria is shifted—subliming out ZrCl$_4$ and HfCl$_4$ (combined) for the next processing step (generally distillation).

TABLE I

| Couple | Summary of the Electromotive Force Series - 450° C. | | | | |
|---|---|---|---|---|---|
| | $E_m°$(Pt), V | $E_m°$(Pt), V | $E_x°$(Pt), V | $E_m°$(Ag), V | Precision, V |
| Li(I)/Li(O) | −3.304 | −3.320 | −3.410 | −2.593 | 0.002 |
| Na(I)/Na(O) | −3.25 | −3.23 | −3.14 | −2.50 | 0.008 |
| H$_2$(g), Fe/H$^-$ | −2.80 | −2.98 | −3.11 | −2.25 | 0.06 |
| Ce(III)/Ce(O) | −2.905 | −2.910 | −2.940 | −2.183 | 0.03 |
| La(III)/La(O) | −2.848 | −2.853 | −2.883 | −2.126 | 0.007* |
| Y(III)/Y(O) | −2.831 | −2.836 | −2.866 | −2.109 | 0.008 |
| Nd(III)/Nd(O) | −2.819 | −2.824 | −2.854 | −2.097 | 0.005* |
| Gd(III)/Gd(O) | −2.788 | −2.793 | −2.823 | −2.066 | 0.005* |
| Mg(II)/Mg(O) | −2.580 | −2.580 | −2.580 | −1.853 | 0.002 |
| Sc(III)/Sc(O) | −2.553 | −2.558 | −2.558 | −1.831 | 0.015 |
| Th(IV)/Th(O) | −2.350 | −2.358 | −2.403 | −1.531 | 0.005*,*** |
| U(III)/U(O) | −2.218 | −2.223 | −2.253 | −1.496 | 0.005** |
| Be(II)/Be(O) | −2.039 | −2.039 | −2.039 | −1.312 | 0.013 |
| Np(III)/Np(O) | −2.033 | −2.038 | −2.068 | −1.311 | 0.005*** |
| U(IV)/U(O) | −1.950 | −1.957 | −2.002 | −1.230 | 0.011** |
| Zr(IV)/Zr(II) | −1.864 | −1.880 | −1.970 | −1.153 | −.01** |
| Mn(II)/Mn(O) | −1.849 | −1.849 | −1.849 | −1.122 | 0.008 |
| Hf(IV)/Hf(O) | −1.827 | −1.835 | −1.880 | −1.108 | 0.01 |
| Np(IV)/Np(O) | −1.817 | −1.825 | −1.870 | −1.098 | 0.004**,*** |
| Zr(IV)Zr(O) | −1.807 | −1.815 | −1.860 | −1.088 | 0.01 |
| Al(III)/Al(O) | −1.762 | −7.767 | −1.797 | −1.040 | 0.009 |
| Zr(II)/Zr(O) | −1.75 | −1.75 | −1.75 | −1.02 | 0.01* |
| Ti(II)/Ti(O) | −1.74 | −1.74 | −1.74 | −1.01 | 0.01 |
| Sm(III)/Sm(II) | −1.713 | −1.729 | −1.819 | −1.002 | 0.006 |
| Pu(III)/Pu(O) | −1.698 | −1.703 | −1.733 | −0.976 | 0.002 |
| Ti(III)/Ti(O) | −1.60 | −1.61 | −1.64 | −0.88 | 0.02** |
| Am(III)/Am(O) | −1.588 | −1.593 | −1.623 | −0.866 | 0.002 |
| Zn(II)/Zn(O) | −1.566 | −1.566 | −1.566 | −0.839 | 0.002 |
| V(II)/V(O) | −1.533 | −1.533 | −1.533 | −0.806 | 0.01 |
| Ti(IV)/Ti(O) | −1.486 | −1.494 | −1.539 | −0.767 | 0.05*** |
| Cm(III)/Cm(O) | −1.470 | −1.475 | −1.505 | −0.748 | 0.005 |
| Tl(I)/Tl(O) | −1.465 | −1.449 | −1.359 | −0.722 | 0.002 |
| Cr(II)/Cr(O) | −1.425 | −1.425 | −1.425 | −0.698 | 0.003 |
| Yb(III)/Yb(II) | −1.359 | −1.375 | −1.465 | −0.648 | 0.003 |
| Ti(III)/Ti(II) | −1.32 | −1.34 | −1.43 | −0.61 | 0.02 |
| Cd(II)/Cd(O) | −1.316 | −1.316 | −1.316 | −0.589 | 0.002 |
| V(III)/V(O) | −1.217 | −1.277 | −1.307 | −0.550 | 0.01** |
| In(1)/In(O) | −1.210 | −1.194 | −1.104 | −0.467 | 0.012 |
| Pu(IV)/Pu(O) | −1.199 | −1.208 | −1.650 | −0.634 | 0.006** |
| Np(IV)/Np(III) | −1.170 | −1.186 | −1.276 | −0.459 | 0.002*** |
| Fe(II)/Fe(O) | −1.172 | −1.172 | −1.172 | −0.445 | 0.005 |
| Se(1),C/Se$_x^{2-}$ | −1.141 | −1.172 | −1.252 | −0.445 | 0.002* |
| Nb(III?)/Nb(O) | −1.15 | −1.16 | −1.19 | −0.43 | 0.1*** |
| U(IV)/U(III) | −1.144 | −1.160 | −1.250 | −0.433 | 0.01 |
| Ga(III)/Ga(O) | −1.136 | −1.141 | −1.171 | −0.414 | 0.008 |
| Cr(III)/Cr(O) | −1.125 | −1.130 | −1.160 | −0.403 | 0.01** |
| Pb(II)/Pb(O) | −1.101 | −1.101 | −1.101 | −0.374 | 0.002 |
| Sn(II)/Sn(O) | −1.082 | −1.082 | −1.082 | −0.355 | 0.002 |
| S(1),C/S$_x^{2-}$ | −1.008 | −1.039 | −1.219 | −0.312 | 0.002* |
| In(III)/In(O) | −1.033 | −1.038 | −1.068 | −0.311 | 0.009** |
| Co(II)/Co(O) | −0.991 | −0.991 | −0.991 | −0.264 | 0.003 |
| Ta(IV)/Ta(O) | −0.957 | −0.965 | −1.010 | −0.238 | 0.01*** |
| In(III)/In(I) | −0.944 | −0.960 | −1.050 | −0.233 | 0.005 |
| Cu(I)/Cu(O) | −0.957 | −0.941 | −0.851 | −0.214 | 0.004 |
| Ni(II)/Ni(O) | −0.795 | −0.795 | −0.795 | −0.068 | 0.002 |
| Ge(II)/Ge(O) | −0.792 | −0.792 | −0.792 | −0.065 | 0.008 |

TABLE I-continued

Summary of the Electromotive Force Series - 450° C.

| Couple | $E_m^*$(Pt), V | $E_m^*$(Pt), V | $E_x^*$(Pt), V | $E_m^*$(Ag), V | Precision, V |
|---|---|---|---|---|---|
| V(III)/V(II) | −0.748 | −0.764 | −0.854 | −0.037 | 0.002 |
| Fe(III)/Fe(O) | −0.753 | −0.758 | −0.788 | −0.031 | 0.006** |
| Ag(I)/Ag(O) | −0.743 | −0.727 | −0.637 | 0.000 | 0.002 |
| Ge(IV)/Ge(O) | −0.728 | −0.736 | −0.781 | −0.009 | 0.008** |
| Sn(IV)/Sn(O) | −0.694 | −0.702 | −0.747 | +0.025 | 0.003** |
| HCl(g)/H$_2$(g), Pt | −0.694 | −0.710 | −0.800 | +0.017 | 0.005 |
| Ge(IV)/Ge(II) | −0.665 | −0.681 | −0.771 | +0.046 | −0.002 |
| Sb(III)/Sb(O) | −0.635 | −0.640 | −0.670 | +0.087 | 0.002 |
| Bi(III)/Bi(O) | −0.635 | −0.640 | −0.670 | +0.087 | 0.01 |
| Hg(II)/Hg(O) | −0.622 | −0.622 | −0.622 | +0.105 | |
| Mo(III)/Mo(O) | −0.603 | −0.608 | −0.638 | +0.119 | 0.002* |
| W(II)/W(O) | −0.585 | −0.585 | −0.585 | +0.142 | 0.015 |
| Eu(III)/Eu(II) | −0.538 | −0.554 | −0.644 | +0.173 | 0.007 |
| Cr(III)/Cr(II) | −0.525 | −0.541 | −0.631 | +0.186 | 0.01 |
| As(III)/As(O) | −0.460 | −0.465 | −0.495 | +0.262 | 0.017 |
| Cu(II)/Cu(O) | −0.448 | −0.448 | −0.448 | +0.279 | 0.003** |
| Tl(III)/Tl(O) | −0.385 | −0.390 | −0.420 | +0.377 | 0.003** |
| Re(IV)/Re(O) | −0.325 | −0.333 | −0.389 | +0.394 | 0.005 |
| Sn(IV)/Sn(II) | −0.310 | −0.326 | −0.416 | +0.416 | 0.003 |
| UO$_2^{2+}$/UO$_2$ | −0.285 | −0.285 | −0.285 | +0.442 | 0.005 |
| I$_2$(g)/C/I$^-$ | −0.207 | −0.254 | −0.525 | +0.473 | 0.008 |
| Pd(II)/Pd(O) | −0.214 | −0.214 | −0.214 | +0.513 | 0.002 |
| Rh(III)/Rh(O) | −0.196 | −0.201 | −0.231 | +0.526 | 0.004 |
| Ru(III)/Ru(O) | −0.107 | −0.112 | −0.142 | +0.615 | 0.007 |
| Te(II)/Te(O) | −0.10 | −0.10 | −0.10 | +0.63 | 0.03 |
| Ir(III)/Ir(O) | −0.057 | −0.062 | −0.092 | +0.665 | 0.002 |
| Pt(II)/Pt(O) | 0.000 | 0.000 | 0.000 | +0.727 | 0.002 |
| Cu(II)/Cu(I) | +0.061 | +0.045 | −0.045 | +0.772 | 0.002 |
| Fe(III)/Fe(II) | +0.086 | +0.070 | −0.020 | +0.797 | 0.003 |
| NpO$_2^+$/NpO | +0.072 | +0.088 | +0.198 | +0.815 | 0.002* |
| NpO$_2^+$/NpO$_2^+$ | +0.102 | +0.086 | −0.004 | +0.723 | 0.020* |
| Pt(IV)/Pt(II) | +0.142 | +0.126 | +0.036 | +0.763 | 0.010 |
| Tl(III)/Tl(I) | +0.155 | +0.139 | +0.049 | +0.866 | 0.002 |
| Br$_2$(g),C/Br$^-$ | +0.177 | +0.130 | −0.141 | +0.857 | 0.002 |
| Au(I)/Au(O) | +0.205 | +0.221 | +0.311 | +0.948 | 0.008 |
| Pu(IV)/Pu(III) | +0.298 | +0.282 | +0.192 | +1.025 | 0.006 |
| Cl$_2$(g),C/Cl$^-$ | +0.322 | +0.306 | +0.216 | +1.033 | 0.002 |

*Extrapolated
**Calculated
***Precision estimated by writer

As noted above, U.S. Pat. No. 4,737,244 to McLaughlin et al. describes an extractive distillation method for separating hafnium from zirconium with a molten salt solvent being circulated through the column to provide a liquid phase, and the molten salt solvent having a composition of at least 30 mole percent zinc chloride and at least 10 mole percent of said chloride. This invention could be used with appropriate other molten salts to purify zirconium-hafnium chlorides before their introduction into such a distillation column, but cannot be used with the circulating molten salt solvent of that patent, as the voltage to remove iron would also remove lead.

Thus this invention is for molten salt systems related to distillation for zirconium-hafnium separation and prevents buildup of iron chloride by electrochemically reducing iron from the molten salt to give very low levels of iron chloride in the distillation column, to reduce corrosion, improve the product and, in some cases, to allow the molten salt system to be run continuously. This method is especially useful as an improvement on the aforementioned related application Ser. No. 242,574, filed Sept. 12, 1988 which utilizes a complex of zirconium-hafnium chlorides and phosphorus oxychloride, and prepurifying the zirconium-hafnium chlorides before introduction into a distillation column. This invention provides improved purification in that process by electrochemically reducing iron from the molten salt in the prepurification system. This invention avoids buildup or actually reduces levels of iron chloride in the purification bath.

Preferably, the molten salt during the electrochemical purification consists essentially of a mixture of alkali metal and alkaline earth metal chlorides, zirconium-hafnium chloride and impurities, but as noted above, the molten salt can consist essentially of any molten halides of elements of whose ions have a higher reduction potential (a higher negative voltage) than iron in the molten salt system being utilized (e.g. from Table I, above, chlorides of alkali metals and alkaline earth metals, zirconium, hafnium, aluminum, and zinc). The purification is by at least periodically removing iron chloride from molten salt by electrochemically plating iron out of said molten salt (with chlorine being evolved at the other electrode; note that if voltages are measured between the two electrodes, e.g., with reference to a chlorine electrode, that the plus 0.32 volts for chlorine is added and thus about 1.5 volts between electrodes is required to remove ferric iron). This invention can be utilized to purify the feed material (and/or, if appropriate, purifying the circulating solvent), in the aforementioned types of systems.

This invention is not to be construed as limited to the particular examples described herein, as this is to be regarded illustrative, rather than restrictive. The invention is intended to cover all processes which do not depart from the spirit or the scope of the invention.

We claim:

1. In a method for separating hafnium chloride from zirconium chloride using a distillation column, with a hafnium chloride enriched vapor stream taken from the top of the column and a zirconium enriched chloride stream taken from the bottom of the column, the improvement comprising:

purifying said zirconium-hafnium chloride in a molten salt purification vessel prior to or after introduction into said distillation column to substantially eliminate iron chloride from the zirconium-hafnium chloride by at least periodically removing iron chloride from said molten salt purification vessel by electrochemically plating iron onto an electrode in said molten salt purification vessel, with the molten salt in said molten salt purification vessel consisting essentially of a mixture of chlorides selected from the group consisting of alkali metals, alkaline earth metals, zirconium, hafnium, aluminum, manganese, and zinc.

2. The method of claim 1, wherein the molten salt in said molten salt purification vessel consists essentially of a mixture of lithium chloride and potassium chloride and zirconium-hafnium chloride.

3. The method of claim 2, wherein said lithium chloride and potassium chloride are present in near-eutectic proportions.

4. The method of claim 3, wherein said lithium chloride and potassium chloride proportions are about 59 mole percent lithium chloride and about 41 mole percent potassium chloride.

5. The method of claim 2, wherein said purification vessel is operated at 300°–400° C.

6. The method of claim 3, wherein said purification vessel is operated essentially isothermally at about 330° C.

7. The method of claim 1, wherein said purification in a molten salt purification vessel is prior to introduction into said distillation column.

8. The method of claim 1, wherein said distillation column has a recirculating molten salt and said recirculating molten salt is circulated to said molten salt purification vessel, whereby purification in a molten salt purification vessel is after introduction of said zirconium-hafnium chloride into said distillation column.

* * * * *